United States Patent
Nakano

(10) Patent No.: US 6,782,796 B2
(45) Date of Patent: Aug. 31, 2004

(54) HYDRAULIC PRESSURE CONTROL VALVE AND VEHICLE BRAKE DEVICE USING THE SAME

(75) Inventor: Keita Nakano, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 38 days.

(21) Appl. No.: 10/260,288

(22) Filed: Oct. 1, 2002

(65) Prior Publication Data

US 2003/0085613 A1 May 8, 2003

(30) Foreign Application Priority Data

Oct. 31, 2001 (JP) ......................................... 2001-334215

(51) Int. Cl.[7] ............................................... F15B 13/14
(52) U.S. Cl. ............................................ 91/434; 60/591
(58) Field of Search ..................... 91/434, 453; 60/591, 60/555

(56) References Cited

U.S. PATENT DOCUMENTS

| | | | |
|---|---|---|---|
| 4,159,854 A | 7/1979 | Peterson | |
| 4,726,629 A | 2/1988 | Resch | |
| 4,729,223 A | 3/1988 | Kervagoret | |
| 5,577,384 A | 11/1996 | Watanabe et al. | |
| 5,897,175 A | 4/1999 | Terazawa et al. | |
| 5,934,326 A | 8/1999 | Kawase | |
| 6,652,041 B2 | 11/2003 | Nishikimi et al. | |

FOREIGN PATENT DOCUMENTS

| | | |
|---|---|---|
| EP | 0389993 | 10/1990 |
| EP | 1078833 | 2/2001 |
| EP | 1225111 | 7/2002 |
| GB | 2162604 | 2/1986 |
| JP | 2757862 | 3/1998 |

OTHER PUBLICATIONS

English Language Abstract of JP 2757862.
English Language Abstract of EP 1078833.

Primary Examiner—Edward K. Look
Assistant Examiner—Michael Leslie
(74) Attorney, Agent, or Firm—Greenblum & Bernstein, P.L.C.

(57) ABSTRACT

A hydraulic pressure control device is provided which is capable of pressure reduction and pressure increase by electronic control without changing over hydraulic circuits, and which is reliable and simple in structure. A vehicle brake device using such a control device is also provided. A pressure chamber and an offset spring are provided in a hydraulic pressure control valve. A spool valve is moved to a position corresponding to brake operating force, thereby changing over connections between the output port and the discharge port and between the output port and the input port, and adjusting the degrees of opening of valve portions. In this manner, the hydraulic pressure at the output port to a value corresponding to the brake operating force is controlled.

7 Claims, 8 Drawing Sheets

HYDRAULIC PRESSURE CONTROL VALVE AND VEHICLE BRAKE DEVICE USING THE SAME

BACKGROUND OF THE INVENTION

This invention relates to a hydraulic pressure control device which permits intervention of electronic control in vehicle braking without changing over a hydraulic circuit, and a vehicle brake device using it.

Among known vehicle brake devices which permit intervention of electronic control, there is a brake-by-wire type device.

This type of brake device has a circuit configuration as shown in FIG. 9 (which shows only a circuit in one line). When a brake pedal 51 is depressed, a fluid line 54 extending from a master cylinder 52 to wheel brakes 53 is shut off by a changeover valve 55. Brake fluid pressure is supplied from a hydraulic pressure source 56 provided with a power-driven pump through a hydraulic pressure control valve 57 and a changeover valve 58 to the wheel brakes 53. The hydraulic pressure control valve 57 uses a spool valve to adjust the brake hydraulic pressure from the hydraulic pressure source 56 to a value proportional to the exciting current and outputs it. In the figure, 59 is a reservoir. This type of control valve is known as one which permits delicate hydraulic pressure control compared with hydraulic pressure control valves in which a pressure increasing valve and a pressure reducing valve are combined. A brake-by-wire type brake device using such a control valve is disclosed e.g. in JP patent publication 2757862.

A vehicle brake device of a brake-by-wire type is high in freedom of intervention of electronic control. Besides braking based on the intent of the driver, it can perform various controls such as BA (brake-assist) control, automatic braking such as ASC (active stability control) which, while the driver is not operating the brake pedal, an ECU (electronic control device) 60 performs judging the necessity of speed decrease and vehicle position control, and regenerative blending brake control for electric vehicles and hybrid cars.

In such a conventional vehicle brake device, upon depressing of the brake pedal 51, it is detected by a brake switch to close the changeover valve 55, and brake hydraulic pressure from the hydraulic pressure source 56, which is in a separate line, is controlled to a value corresponding to a command from the ECU 60 by means of the hydraulic pressure control valve 57 and supplied to the wheel brakes.

Also, a failure in the line connecting to the hydraulic pressure source 56 is detected based on sensor information from e.g. pressure sensors 61a and 61b. When a failure occurs, the changeover valve 55 is opened to supply the brake fluid pressurized in the master cylinder 52 to the wheel brakes 53.

Such a conventional device in which detection of a failure is done based on sensor information is inferior in reliability. If the information from sensors is wrong, it is possible that control based on wrong information is carried out, so that even if the line connecting with the hydraulic pressure source 56 fails, the changeover valve 55 is not opened and the brakes do not work.

Also, sensors for detecting a failure and circuits for carrying out failure judgment are needed. This increases the cost.

An object of this invention is to provide a simple and highly reliable hydraulic pressure control device and a vehicle brake device using the same.

SUMMARY OF THE INVENTION

According to this invention, there is provided a hydraulic pressure control device comprising a housing formed with an input port connected to a hydraulic pressure source, an output port connected to wheel brakes, and a discharge port, a spool valve mounted in the housing so as to be acted by a brake operating force, a first valve portion formed between the spool valve and the discharge port so as to close to disconnect the output port from the discharge port when the spool valve advances, and when the spool valve further makes advancing displacement, a second valve portion formed between the spool valve and the input port so as to open when the spool valve advances further, whereby bringing the input port into communication with the output port, the degrees of opening of the respective valve portions being adjusted according to the amount of displacement of the spool valve, whereby outputting a hydraulic pressure balancing with the brake operating force acted on the spool valve, an offset spring for biasing the spool valve in a backward direction to impart an offset force corresponding to the amount of pressure reduction required for pressure-reducing control, and a pressure chamber for applying hydraulic pressure introduced from outside to the spool valve in an advancing direction.

Also, there is provided a vehicle brake device comprising the hydraulic pressure control device claimed in claim 1, a hydraulic pressure source connected to the input port of the hydraulic pressure control device, a reservoir, a pressure-adjusting valve for receiving a substantially constant pressure $P_1$ from the hydraulic pressure source and supplying it to the pressure chamber, a first valve for pressure increase control for opening and closing a fluid passage connecting between the pressure-adjusting valve and the pressure chamber, and a valve for pressure reduction control for opening and closing a fluid passage connecting between the pressure chamber and the reservoir, wherein the area a of a pressure-receiving portion of the spool valve which faces the pressure chamber, the force F of the offset spring, and the pressure $P_1$ adjusted by the pressure-adjusting valve are set so as to satisfy the formula $a \cdot P_1 < F$.

Further, there is also provided a vehicle brake device wherein a fluid passage extending from the hydraulic pressure source to the pressure chamber of the hydraulic pressure control device is provided, and a second valve for pressure increase control is provided in the fluid passage for BA control and automatic braking.

In these vehicle brake devices, it is preferable that at least one of the first valve for pressure increase control and the valve for pressure reduction control is a valve capable of electric pressure control. Also, a relief valve is preferably provided between the pressure-adjusting valve and the first valve for pressure increase control.

Further, according to this invention, there is also provided a vehicle brake device wherein the wheel brakes are divided into two lines, namely, a first line and a second line, with the wheel brakes in the first line in communication with the output port of the hydraulic pressure control device, further comprising a master cylinder and a copying valve, the master cylinder comprising a first piston acted by a brake operating force, a second piston arranged in front of the first piston, a spring arranged between the first piston and the second piston, brake fluid between the first piston and the second piston being pressurized, the master cylinder transmitting the brake operating force to the spool valve of the hydraulic pressure control device through the first piston, the spring and the second piston, the copying valve closing under fluid pressure in the first line while the first line is normal, to shut off a fluid passage extending from the master cylinder to the wheel brakes in the second line, whereby transmitting the hydraulic pressure in the first line to the wheel brakes in the second line, and if the first line fails, the copying valve being kept open so that brake fluid pressurized by the master cylinder is supplied to the wheel brakes in the second line.

In the vehicle brake device according to this invention, during normal braking, since the pressure chamber of the hydraulic pressure control device of this invention is maintained at hydraulic pressure $P_1$ adjusted by the pressure-adjusting valve and the pressure $P_1$ balances with the offset spring force F, when an operating force is applied from a brake operating member such as the brake pedal to the spool valve, the hydraulic pressure control device, which has the spool valve, adjusts the hydraulic pressure supplied from the hydraulic pressure source to a value corresponding to the brake operating force (which is larger than the hydraulic pressure that can be generated manually) and outputs it. Thus, during normal braking, braking is done based on the will of the driver.

During pressure reduction control such as regenerative blending brake control, the driver applies an operating force to the spool valve in the same manner as during normal braking. But at this time, the first valve for pressure increase control and the valve for pressure reduction control are driven on command from the ECU to lower the hydraulic pressure introduced into the pressure chamber in the range of $P_1$ to 0, thereby weaking the braking force.

Further, during pressure increase control such as automatic braking, the second valve for pressure increase control and the valve for pressure reduction control are driven on command from the ECU to control the hydraulic pressure in the pressure chamber in the range of $P_1$ to Pmax (maximum hydraulic pressure that the hydraulic pressure source can generate). This hydraulic pressure applies force in the advancing direction to the spool valve, so that the brake hydraulic pressure from the hydraulic pressure source is adjusted to a value corresponding to the spool driving force which includes the input from the brake operating member and is supplied to the wheel brakes.

As described above, since pressure reduction and increase by electronic control are possible in addition to ordinary braking without changing over hydraulic circuits, it is not necessary to use failure judgement by the ECU for control. Even if the sensor information is wrong, the will of the driver is reliably reflected on braking, so that reliability of the device increases.

Operations and effects of the arrangements that have been described above as preferable will be described below.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
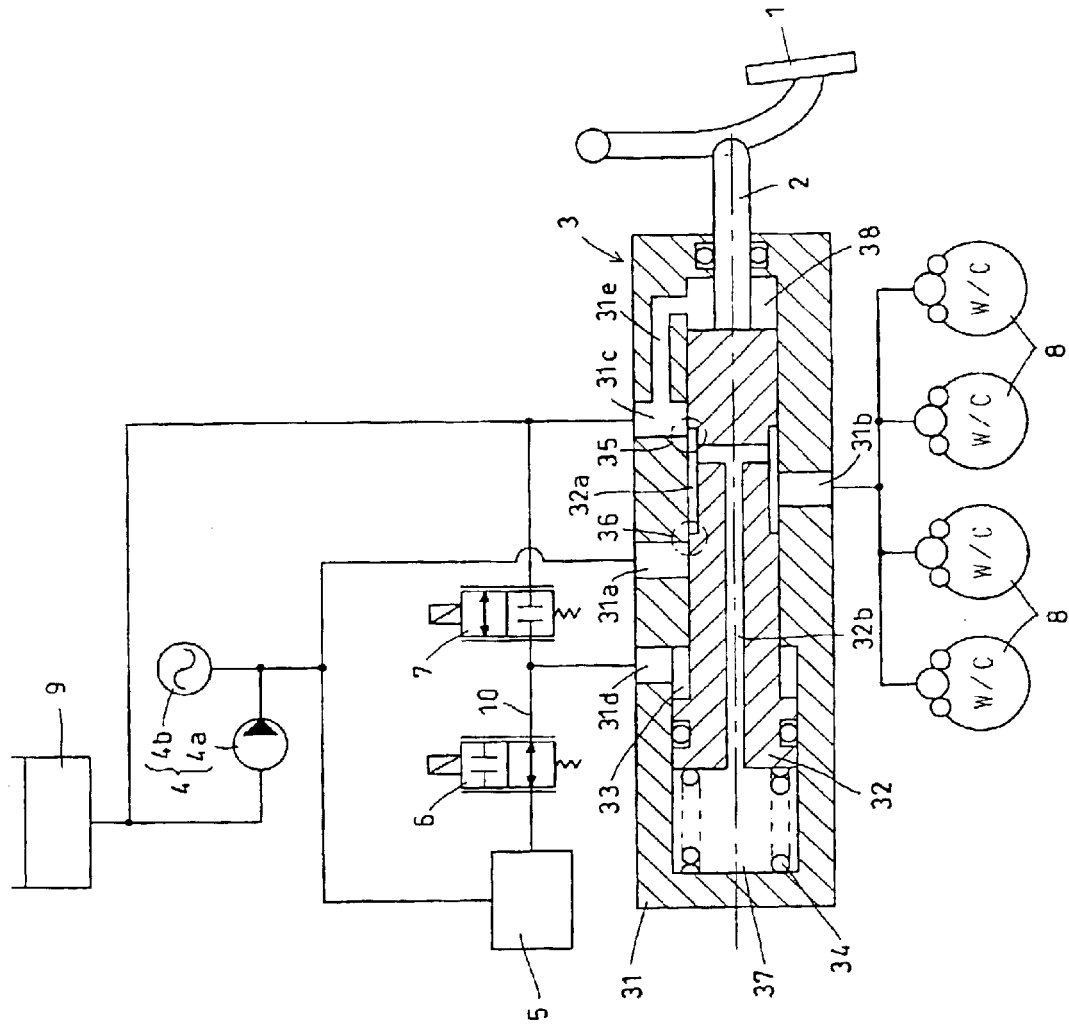
FIG. 1 is a circuit diagram of a first embodiment of a vehicle brake device using the hydraulic pressure control device according to this invention.

FIG. 1 shows the first embodiment of this invention. This brake device comprises a brake operating member (a brake pedal 1 in this embodiment), a hydraulic pressure control device 3 to which an operating force is applied from the brake pedal 1 through an input rod 2, a hydraulic pressure source 4 including a power-driven pump 4a and a pressure accumulator 4b, a pressure adjusting valve 5 connected to the hydraulic pressure source 4, a first valve 6 for pressure increasing control, a valve 7 for pressure reducing control (hereinbelow, they may be simply called valves), wheel brakes 8, and a reservoir 9.

The hydraulic pressure control device 3 has a spool valve 32 mounted in a housing 31 which has an input port 31a, output port 31b, discharge port 31c and pressure-adjusting port 31d. It also has a pressure chamber 33 for applying the hydraulic pressure introduced through the pressure-adjusting port 31d to the spool valve 32 with the rear end face of a large-diameter portion formed at the tip of the spool valve 32 as a pressure-receiving surface, and an offset spring 34 biasing the spool valve 32 in the return direction.

The force F of the offset spring 34, the pressure value $P_1$ adjusted by the pressure-adjusting valve 5, and the pressure-receiving area a of the spool valve 32 facing the pressure chamber 33 are set so as to satisfy the formula $a \cdot P_1 < F$. Since the difference α between $a \cdot P_1$ and F (i.e. $a \cdot P_1 + \alpha = F$) is a force acting to reduce the brake operating force, it is preferably as small as possible.

In this hydraulic pressure control device 3, the input port 31a is connected to the hydraulic pressure source 4, the output port 31b to the wheel brakes 8, the discharge port 31c to the reservoir 9, and the pressure-adjusting port 31d to the pressure adjusting valve 5 through the valve 6. The pressure-adjusting port 31d is also connected to the reservoir 9 through the valve 7.

The spool valve 32 has a groove passage 32a. When the spool valve 32 is in the initial position (illustrated in FIG. 1), the output port 31b communicates with the discharge port 31c through the groove passage 32a. Also, when the spool valve 32 advances, a valve portion 35 formed between the shoulder portion of the spool valve 32 and the edge of the discharge port 31c will close, so that the output port 31b is shut off from the discharge port 31c. As the spool valve 32 further displaces or advances, a valve portion 36 formed between the shoulder portion of the spool valve 32 and the edge of the input port 31a will open, so that the output port 31b communicates with the input port 31a.

The valve portions 35 and 36 have their degrees of opening adjusted according to the amount of displacement of the spool valve 32, whereby hydraulic pressure from the hydraulic pressure source 4 is controlled to a value corresponding to the spool driving force and the controlled pressure is supplied to the wheel brakes 8.

Figure 7:
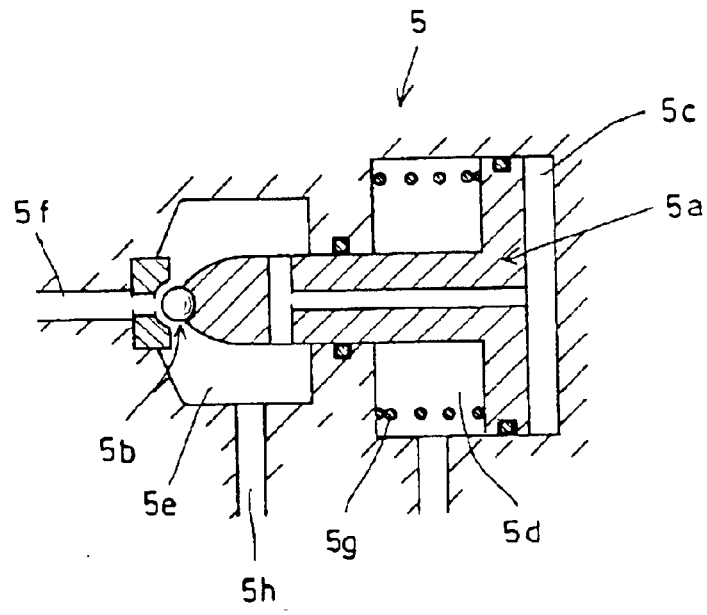
FIG. 7 is a sectional view showing one example of the pressure-adjusting valve.

The pressure-adjusting valve 5 receives a constant pressure from the hydraulic pressure source 4 and outputs it. FIG. 7 shows an example of the pressure-adjusting valve. The illustrated pressure-adjusting valve 5 has a pressure-adjusting piston 5a and a valve portion 5b actuated by the piston 5a. The piston 5a is a pressure-responsive piston. It has a large-diameter portion and a small-diameter portion. The back of the large-diameter portion faces a fluid chamber 5c and its front surface faces an atmospheric chamber 5d (which is open to the atmosphere or connected to the reservoir 9, which is at the atmospheric pressure) and its small-diameter portion is liquid-tightly and slidably inserted in a partitioning wall between the atmospheric chamber 5d and a connecting chamber 5e.

The pressure-adjusting piston 5a receives hydraulic pressure supplied from the hydraulic pressure source 4 on the back of its large-diameter portion. The hydraulic pressure is introduced into the valve 5 through an input port 5f and reach the fluid chamber 5c through a connecting chamber 5e and a connecting passage in the piston. The piston 5a moves while compressing a spring 5g to close the valve portion 5b when the piston thrust under the hydraulic pressure exceeds the pressure preset by the spring 5g. The hydraulic pressure sealed in the connecting chamber 5e when the valve portion 5b is closed is substantially constant, and the hydraulic pressure flows through the outlet port 5h to the valve 6 in FIG. 1.

The first valve 6 for pressure increasing control opens and closes a fluid line 10 connecting between the pressure-adjusting valve 5 and the pressure chamber 33. The illustrated valve 6 not only merely opens and closes the fluid line, but it can perform pressure control according to the exciting current (such a valve is called a linear valve).

For the valve 7 for pressure reducing control also, such a linear valve is used. The valve 6 is preferably of a normally open type, while the valve 7 is preferably of a normally closed type.

In the brake device of FIG. 1 of such a structure as described above, in normal braking, hydraulic pressure $P_1$ (e.g. 2 MPa) adjusted by the pressure-adjusting valve 5 is introduced into the pressure chamber 33 and the driver steps on the brake pedal in normal braking. When the brake pedal 1 is stepped in, the spool valve 32 controls the hydraulic pressure from the hydraulic pressure source 4 to a value corresponding to the stepping force. The controlled hydraulic pressure is supplied to the wheel brakes 8.

In pressure-reducing control such as regenerative blending brake control, hydraulic pressure in the pressure chamber 33 is controlled in the range of $P_1$ to 0 by electromagnetic control of the valve 6 and valve 7 based on the command from the ECU (not shown).

At this time, the offset spring force F, which has been canceled by the force of $A \cdot P_1$ (A is the area of the pressure-receiving portion of the spool valve facing the pressure chamber 33) during normal braking, acts to reduce the spool driving force by the spool driving force. Thus the brake force by hydraulic pressure becomes weaker than during normal braking.

A chamber 37 in which the tip of the spool valve 32 is disposed normally communicates with the output port 31b through a passage 32b formed in the spool valve. With this arrangement, returning force by the hydraulic pressure introduced into the chamber 37 acts on the spool valve 32. Using this force, it is possible to apply a reaction force corresponding to the stepping force to the brake pedal 1. In the illustrated control device 3, a chamber 38 in which the rear end of the spool valve 32 is disposed normally communicates with the reservoir 9 through a passage 31e.

If the valve 7 is a linear valve, an ordinary on-off valve having no pressure control function may be used as the valve 6. If both of the valves 6 and 7 are on-off valves, it is impossible to delicately control the hydraulic pressure in the pressure chamber 33. Thus at least one of them (preferably the valve 7) is preferably a linear valve.

Figure 2:
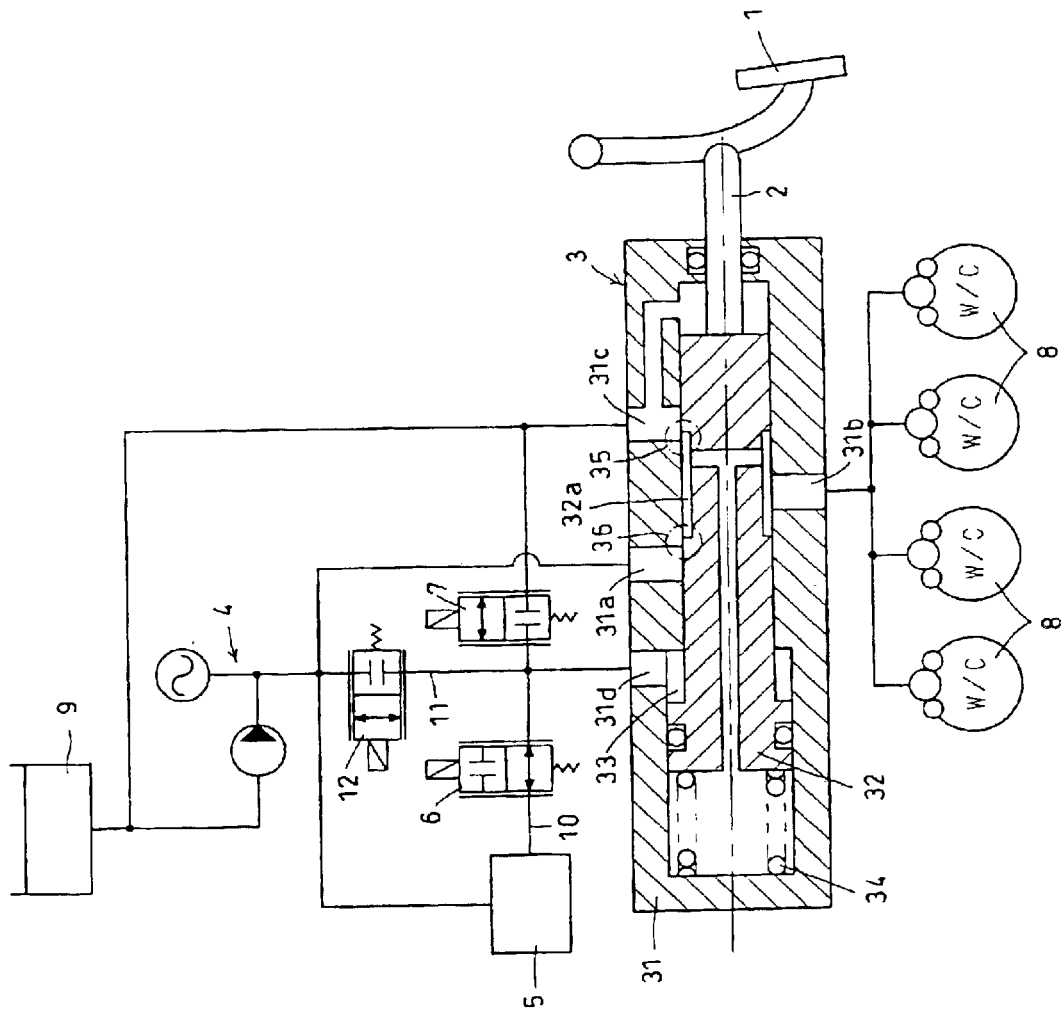
FIG. 2 is a circuit diagram of a vehicle brake device of a second embodiment.

FIG. 2 shows the second embodiment. The vehicle brake device of FIG. 2 is provided with a fluid passage 11 extending from the hydraulic pressure source 4 to the pressure chamber 33 and a second valve 12 for pressure increasing control (a linear valve in the embodiment) is provided in the fluid passage 11. In this regard, it differs from the device of FIG. 1.

In the device of FIG. 2, when the valves 6 and 7 are closed and the valve 12 is opened, hydraulic pressure from the hydraulic pressure source 4 is introduced into the pressure chamber 33. The hydraulic pressure in the pressure chamber 33 is raised to a desired pressure by adjusting the degree of opening of the valve 12. Also, if necessary, the valve 7 is opened and its degree of opening is adjusted to lower the pressure. This makes it possible to control the hydraulic pressure in the pressure chamber 33 in the range of $P_1$ to Pmax. Thus, with this hydraulic pressure, it is possible to assist in the brake operation performed by the driver (BA control), or apply automatic braking by driving the spool 32 while the brake pedal 1 is not being operated.

The control modes and the valve position in the vehicle brake device of FIG. 2 are listed in Table 1.

Figure 8:
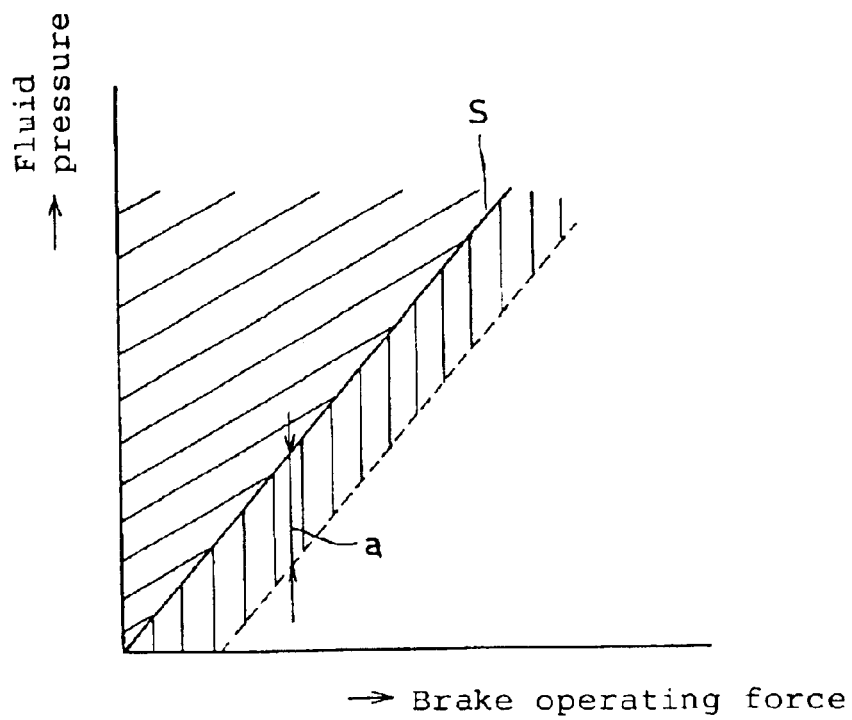
FIG. 8 is a graph showing a hydraulic pressure control range of the vehicle brake device according to this invention.
Figure 9:
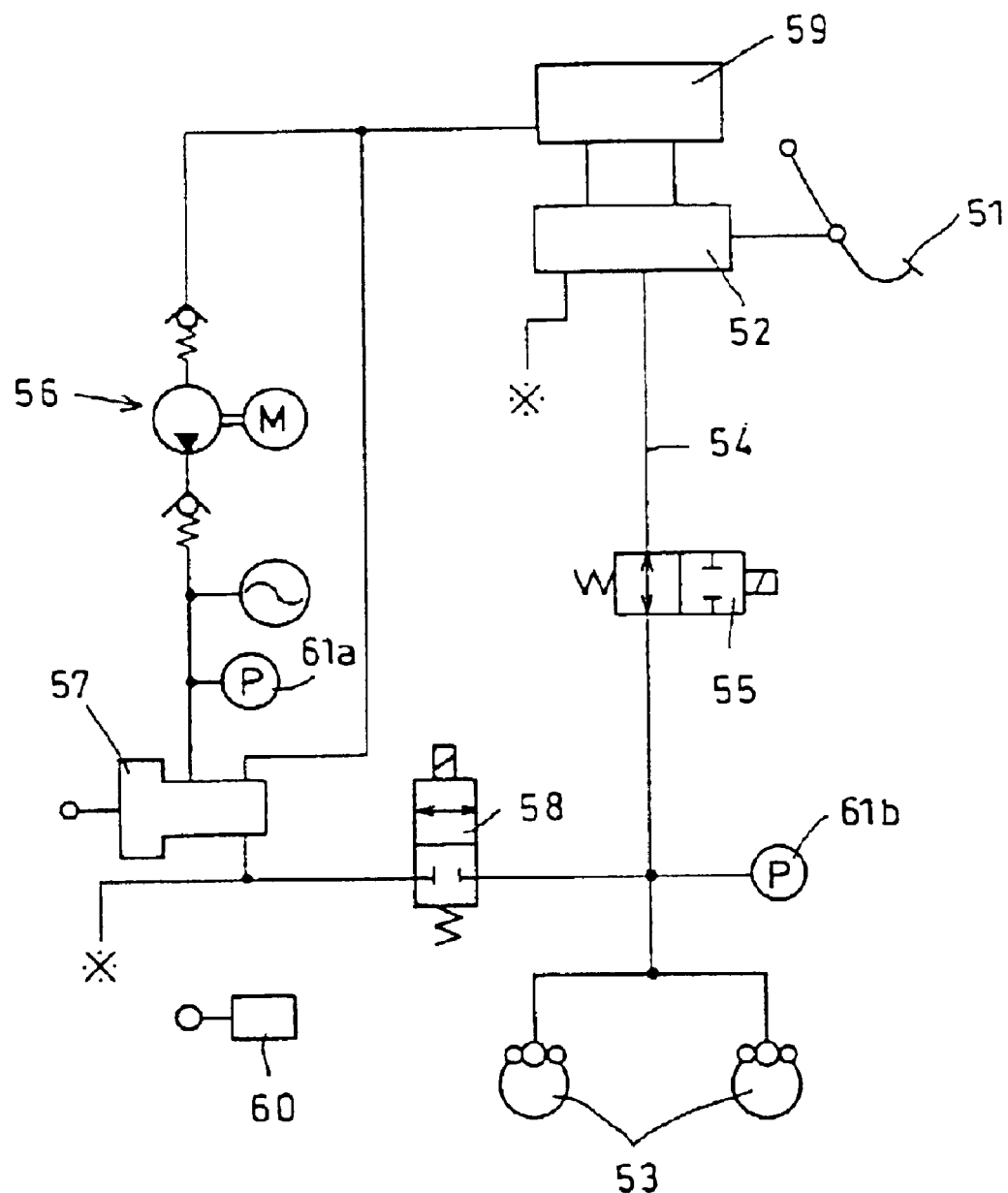
FIG. 9 is a circuit diagram of a conventional brake-by-wire type vehicle brake device in simplified form.

The hydraulic pressure control range by the device of FIG. 2 is shown in FIG. 8. The solid line S indicates the hydraulic pressure during normal braking. The dotted line indicates the hydraulic pressure during control in which the hydraulic pressure in the pressure chamber 33 is zero. When the hydraulic pressure in the pressure chamber 33 is adjusted in the range of $P_1$ to Pmax, pressure-increasing control is performed in the region over the line S. If the hydraulic pressure in the pressure chamber 33 is is controlled in the range of 0 to $P_1$, pressure-reducing control is performed in the region under the line S (hatched by vertical lines). The pressure reduction width a during pressure-reducing control is determined by the force of the offset spring 34. Since the pressure reduction width a is the limit of pressure reduction, pressure will not infinitely drop due to abnormality of electronic control. Thus dangerous situation such as no braking will never occur.

Figure 3:
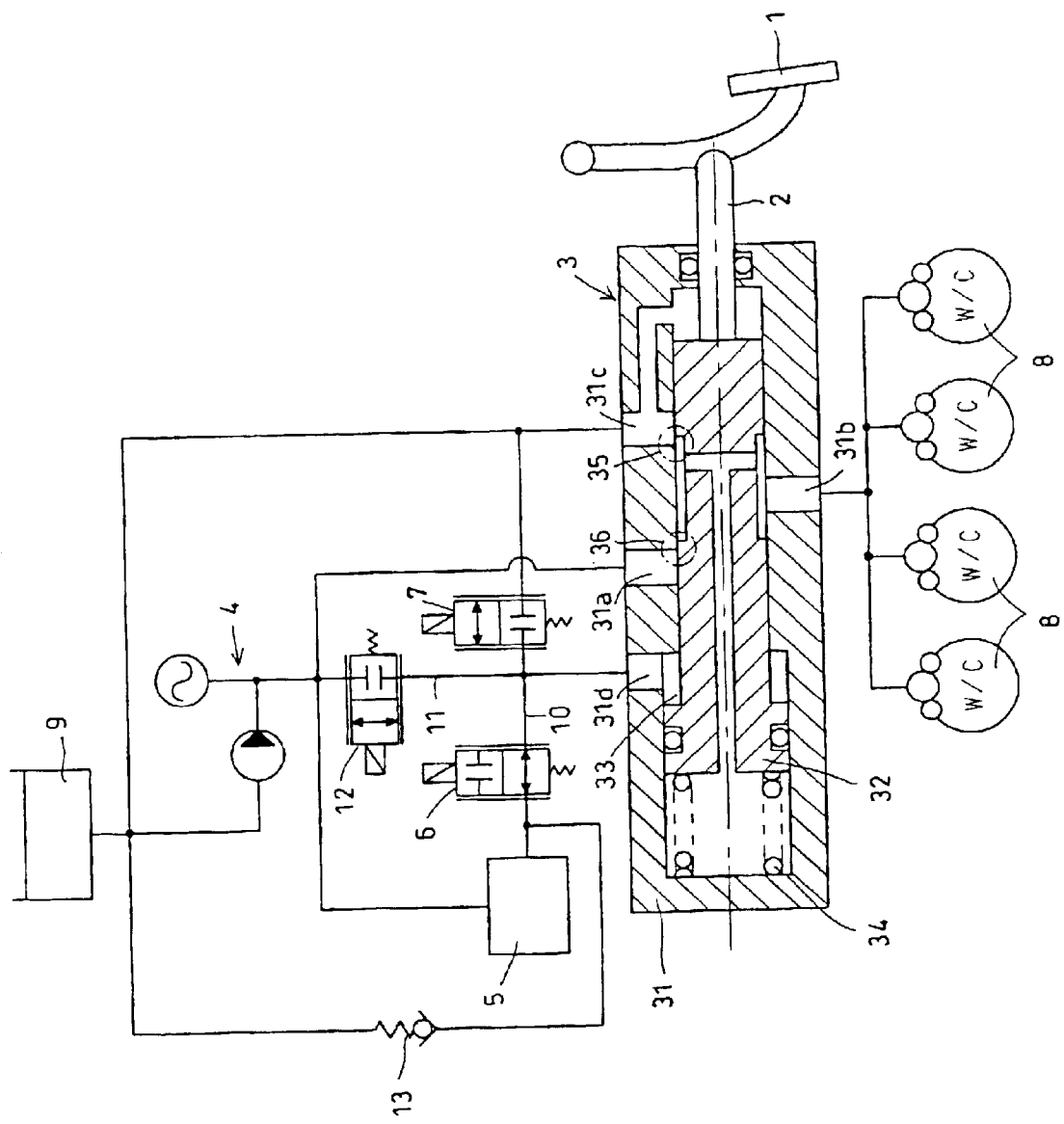
FIG. 3 is a circuit diagram of a vehicle brake device of a third embodiment.

FIG. 3 shows the third embodiment in which a relief valve 13 is added to the vehicle brake device of FIG. 2. The relief valve 13 is provided in a fluid passage between the pressure-adjusting valve 5 and the valve 6. If hydraulic pressure exceeding $P_1$ is outputted from the pressure-adjusting valve 5 due to its failure, the relief valve 13 serves to release any excess pressure to the reservoir 9 to prevent abnormal pressure rise in the pressure chamber 33. This prevents brake not intended by the driver from being applied.

Figure 4:
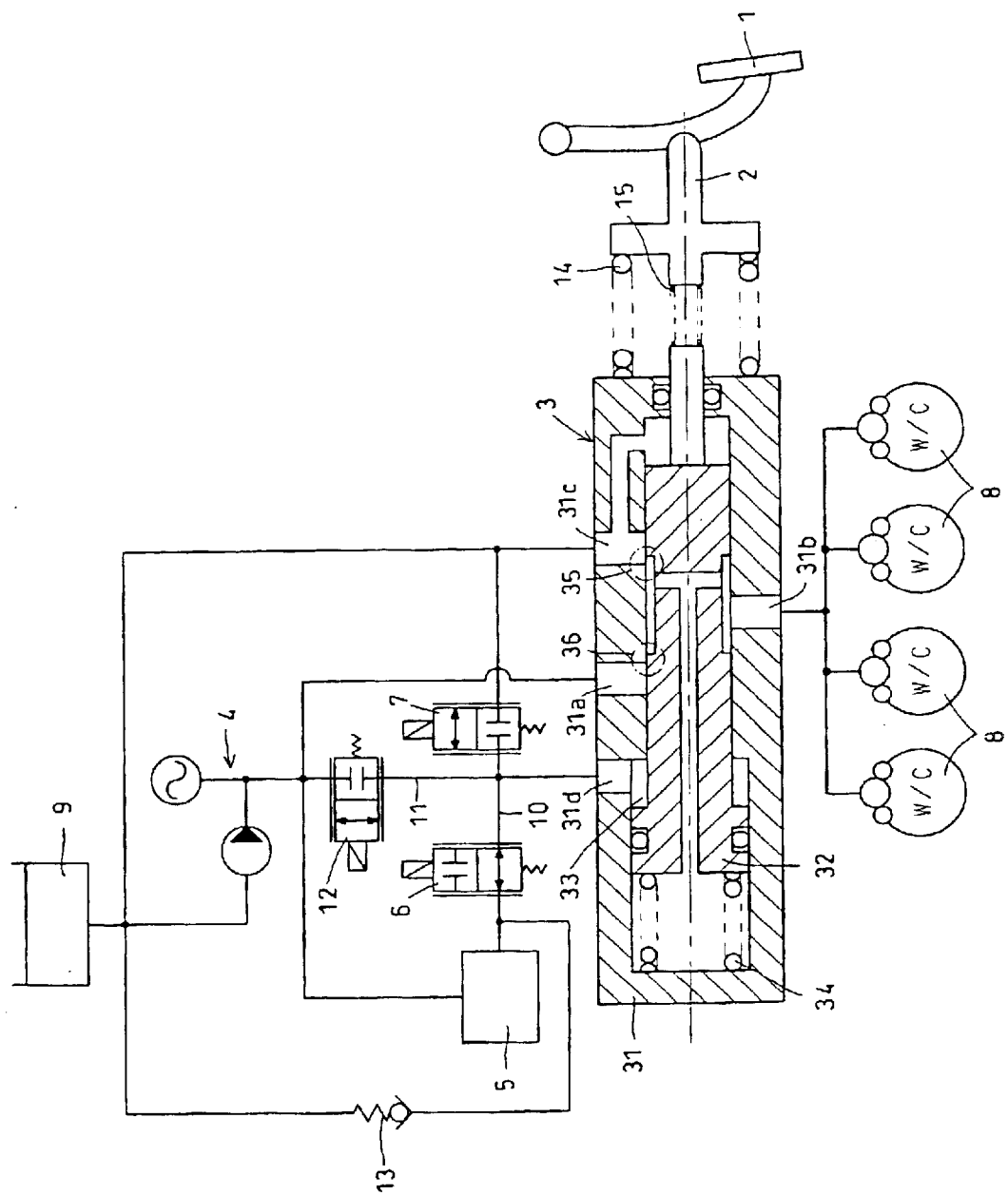
FIG. 4 is a circuit diagram of a vehicle brake device of a fourth embodiment.

FIG. 4 shows the fourth embodiment in which to the device of FIG. 3, a spring 14 for applying operational reaction force to the brake pedal 1 and a spring 15 for transmitting the pedal operating force to the spool valve 32 are added. With this device, so-called board-stepping-like hard feeling of the brake pedal 1 is eliminated. Thus the pedal feeling improves. The input rod 2 is divided into two portions and the spring 15 is disposed between these two portions. But it may be arranged e.g. between the input rod 2 and the spool valve 32.

Figure 5:
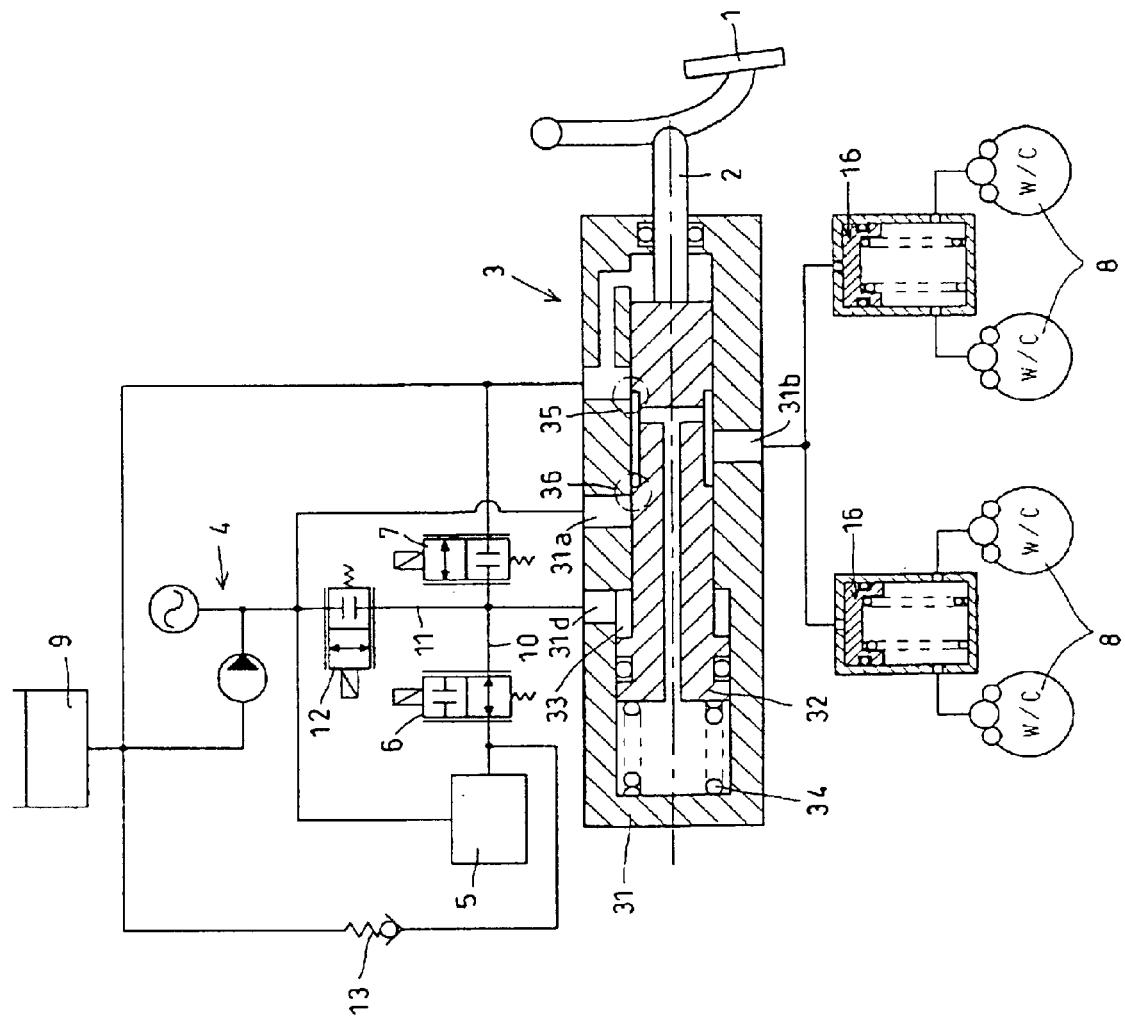
FIG. 5 is a circuit diagram of a vehicle brake device of a fifth embodiment.

FIG. 5 shows the fifth embodiment in which pistons 16 for failsafe are added to the vehicle brake device of FIG. 3. In this device, the wheel brakes 8 are divided into two lines and a piston 16 for failsafe for transmitting hydraulic pressure is disposed between the wheel brakes in each line and the hydraulic pressure control device 3. With this arrangement, if e.g. fluid leakage occurs in a wheel brake in one of the lines, the other line is protected and survives. Thus the safety of the vehicle improves. Of course, one piston 16 for failsafe may be provided for each wheel brake.

Figure 6:
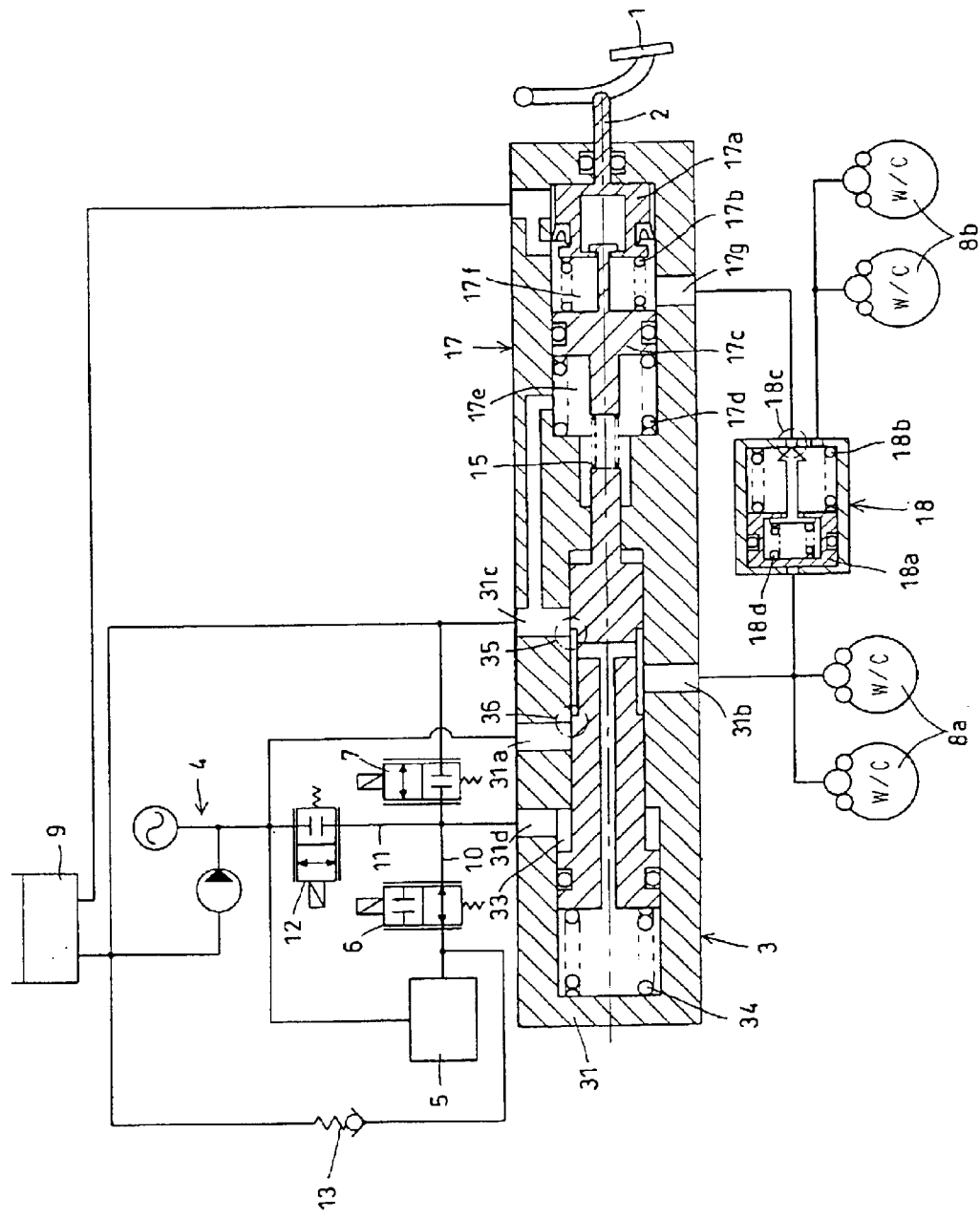
FIG. 6 is a circuit diagram of a vehicle brake device of a sixth embodiment.

FIG. 6 shows the sixth embodiment in which a master cylinder 17 and a copying valve 18 are added to the vehicle brake device of FIG. 3. In this device, the wheel brakes are divided into two lines with the wheel brakes 8a in the first line communicating with the output port 31b of the hydraulic pressure control device 3 and the wheel brakes 8b in the second line connected to the hydraulic pressure control device 3 and the master cylinder 17 through the copying valve 18.

The master cylinder 17 includes a first piston 17a which receives an operating force from the brake pedal 1 through the input rod 2, a second piston 17c arranged in front of the piston 17a through a spring 17b, and an operational reaction force generating spring 17d which also serves as a spring for returning the second piston. A spring 15 for transmitting the operating force is disposed between the second piston 17c of the master cylinder and the spool valve 32 with a chamber 17e which the front surface of the second piston 17c faces communicating with the reservoir 9, and a fluid chamber 17f between the first piston 17a and the second piston 17c normally communicating with an output port 17g so that when the first piston 17a returns to the illustrated original position, the fluid chamber 17f communicates with the reservoir 9, too.

The copying valve 18 includes a piston 18a that is acted on by the hydraulic pressure in the first line and transmits it to the wheel brakes 8b in the second line, a spring 18b for returning the piston 18a, a valve portion 18c adapted to close at the initial period of movement of the piston 18a, thereby cutting the master cylinder 17 off from the wheel brakes 8b in the second line, and a spring 18d that keeps the valve body of the valve portion movable relative to the piston 18a.

In the device of FIG. 6 which has the copying valve 18 and the master cylinder 17, when the brake pedal 1 is depressed, the operating force is transmitted through the first piston 17a, spring 17b, second piston 17c and spring 15, and the spool valve 32 is pushed in. With this movement, the input port 31a communicates with the output port 31b, so that hydraulic pressure corresponding to the operating force will be supplied to the wheel brakes 8a in the first line from the hydraulic pressure source 4. Simultaneously, by the hydraulic pressure that has flown into the first line, the valve portion 18c of the copying valve 18 is closed, so that brake fluid in the copying valve is pressurized by the piston 18a. Thus, hydraulic pressure is supplied to the wheel brakes 8b in the second line, too.

Also, if hydraulic pressure is not supplied to the first line e.g. due to a failure of the hydraulic pressure source 4, the valve portion 18c of the copying valve 18 will remain open, so that hydraulic pressure generated in the master cylinder 17, i.e. brake fluid in the fluid chamber 17f, which has been pressurized by the first piston 17a, flows to the wheel brakes 8b in the second line through the copying valve 18. Thus, a required braking force is ensured for safety.

For the master cylinder 17, it is not desirable that the fluid chamber 17f is pressurized by the first piston 17a before the input port 31a of the hydraulic pressure control device 3 communicates with the output port 31b, so that a large amount of the pressurized brake fluid flows into the wheel brakes 8b. Thus, it is necessary to set the forces of the springs 17b and 17d so that the initial force of the spring 17b will not be too weak compared to the force of the spring 17d.

As described above, in the hydraulic pressure control device and the vehicle brake device using it according to this invention, a pressure chamber and an offset spring that apply forces in opposite directions to the spool valve are added to a hydraulic pressure control valve which controls, using a spool valve, hydraulic pressure from the hydraulic pressure source to a value corresponding to the brake operating force.

In a normal state, hydraulic pressure $P_1$ adjusted by the pressure-adjusting valve is introduced into the pressure chamber. On the other hand, during pressure reduction by electronic control, hydraulic pressure in the pressure chamber is controlled in the range of $P_1$ to 0, while during pressure reduction by electronic control, the hydraulic pressure in the pressure chamber is controlled in the range of $P_1$ to Pmax. This eliminates the need of changeover of hydraulic circuits during intervention of electronic control. Thus, there is no need to introduce failure judgement by the ECU into control, and even if the sensor information is wrong, the intention of the driver is reflected on braking. Besides, no pressure reduction exceeding the limit will occur in pressure reduction control, so that reliability increases.

Also, since the circuit is simplified, compactness and low cost of the device are achieved.

The one using linear valves as the valve for pressure increase control or the valve for pressure reduction control can perform accurate pressure reduction control. This makes it possible to increase the performance of the device.

The one in which a relief valve is provided between the pressure-adjusting valve and the first valve for pressure increase control, the one in which a piston for failsafe is provided between the wheel brakes and the hydraulic pressure control valve, and the one in which hydraulic pressure is supplied to the wheel brakes in the second line from the master cylinder upon failure of the first line further improve safety and reliability.

Besides, the one in which an operational reaction force is applied to the brake pedal by a spring and the pedal operating force is transmitted to the spool valve through the spring improves the pedal feeling.

TABLE 1

|  | 2nd valve for pressure increase control (linear valve) | Valve for pressure reduction control (linear valve) | 1st valve for pressure increase control (linear or on-off valve) | Pressure reduction in pressure chamber |
| --- | --- | --- | --- | --- |
| Ordinary brake | closed | closed | open | $P_1$ |
| Pressure | linear control | linear control | closed | $P_1 \sim P_{max}$ |

TABLE 1-continued

|  | 2nd valve for pressure increase control (linear valve) | Valve for pressure reduction control (linear valve) | 1st valve for pressure increase control (linear or on-off valve) | Pressure reduction in pressure chamber |
|---|---|---|---|---|
| increase control Automatic brake (BA, ASC etc.) Pressure reduction control Regenerative blending control | closed | linear control | linear or on-off control | $0 \sim P_1$ |

What is claimed is:

1. A vehicle brake device comprising:

a hydraulic pressure control device, including a housing formed with an input port connected to a hydraulic pressure source, an output port connected to wheel brakes, and a discharge port, a spool valve mounted in said housing so as to be acted by a brake operating force, a first valve portion formed between said spool valve and said discharge port so as to close to disconnect said output port from said discharge port when said spool valve advances, and when the spool valve further makes advancing displacement, a second valve portion formed between said spool valve and said input port so as to open when said spool valve advances further, whereby bringing said input port into communication with said output port, the degrees of opening of said respective valve portions being adjusted according to the amount of displacement of said spool valve, whereby outputting a hydraulic pressure balancing with the brake operating force acted on said spool valve, an offset spring for biasing said spool valve in a backward direction to impart an offset force corresponding to the amount of pressure reduction required for pressure-reducing control, and a pressure chamber for applying hydraulic pressure introduced from outside to said spool valve in an advancing direction;

a hydraulic pressure source connected to said input port of said hydraulic pressure control device, a reservoir, a pressure-adjusting valve for receiving a substantially constant pressure $P_1$, from said hydraulic pressure source and supplying it to said pressure chamber, a first valve for pressure increase control for opening and closing a fluid passage connecting between said pressure-adjusting valve and said pressure chamber, and a valve for pressure reduction control for opening and closing a fluid passage connecting between said pressure chamber and said reservoir, wherein the area a of a pressure-receiving portion of said spool valve which faces said pressure chamber, the force F of said offset spring, and the pressure $P_1$ adjusted by said pressure-adjusting valve are set so as to satisfy the formula $a \cdot P_1 < F$.

2. A vehicle brake device as claimed in claim 1 wherein at least one of said first valve for pressure increase control and said valve for pressure reduction control is a valve which is capable of electric pressure control.

3. A vehicle brake device as claimed in claim 1 wherein a fluid passage extending from said hydraulic pressure source to said pressure chamber of said hydraulic pressure control device is provided, and a second valve for pressure increase control is provided in said fluid passage.

4. A vehicle brake device as claimed in claim 1 wherein a relief valve is provided between said pressure-adjusting valve and said first valve for pressure increase control.

5. A vehicle brake device as claimed in claim 1 further comprising a spring for applying an operational reaction force to the brake pedal, and a compression spring for transmitting the pedal operating force to said spool valve.

6. A vehicle brake device as claimed in claim 1 wherein a piston for failsafe for transmitting hydraulic pressure is provided between the wheel brakes and said hydraulic pressure control device.

7. A vehicle brake device as claimed in claim 1 wherein the wheel brakes are divided into two lines, namely, a first line and a second line, with the wheel brakes in the first line in communication with said output port of said hydraulic pressure control device, further comprising a master cylinder and a copying valve, said master cylinder comprising a first piston acted by a brake operating force, a second piston arranged in front of said first piston, a spring arranged between said first piston and said second piston, brake fluid between said first piston and said second piston being pressurized, said master cylinder transmitting the brake operating force to said spool valve of said hydraulic pressure control device through said first piston, said spring and said second piston, said copying valve closing under fluid pressure in said first line while said first line is normal, to shut off a fluid passage extending from said master cylinder to the wheel brakes in said second line, whereby transmitting the hydraulic pressure in said first line to the wheel brakes in said second line, and if said first line fails, said copying valve being kept open so that brake fluid pressurized by said master cylinder is supplied to the wheel brakes in said second line.

\* \* \* \* \*